350-6.6 SR
XR 3,437,796
CROSS REFERENCE
April 8, 1969 E. F. LAPORNIK 3,437,796
READING MACHINE OPTICAL SYSTEM FOR SELECTED SCANNING AND DISPLAY
Filed Oct. 18, 1965
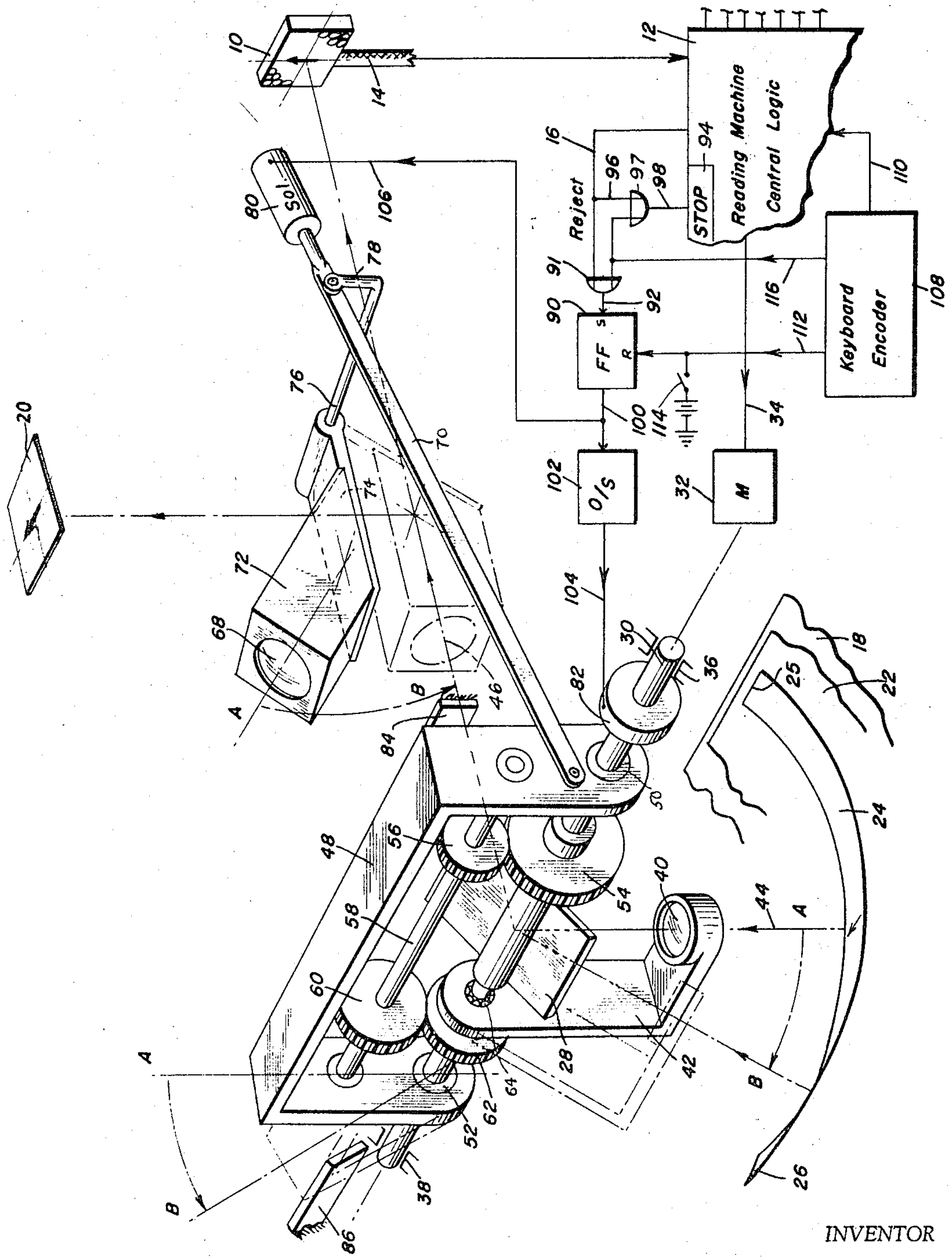
INVENTOR
Edward F. Lapornik
BY Joseph A. Genovese
ATTORNEY
3437796
OR IN 235/61.11E United States Patent Office 3,437,796

Patented Apr. 8, 1969

3,437,796

READING MACHINE OPTICAL SYSTEM FOR SELECTED SCANNING AND DISPLAY

Edward F. Lapornik, Washington, D.C., assignor to Control Data Corporation, Rockville, Md.

Filed Oct. 18, 1965, Ser. No. 496,989
Int. Cl. G06k 7/00; G01n 21/30; H04n 3/00
U.S. Cl. 235—61.11 7 Claims

ABSTRACT OF THE DISCLOSURE

A character reading machine optical system which provides a fixed-length optical path between a document and the machine scanner while presenting to the scanner images of successive characters of a line of print of appreciable length on the document. The optical system includes a lens and mirror assembly which is movable upon a command signal into optical path to display one or more of the characters and movable from the optical path, unblocking it and enabling the images to be formed on the scanner.

This invention relates to character reading machines and particularly to optical systems for presenting images of successive characters to the reading machine scanner or to a display device so that they may be inspected by a human operator.

In various reading machine systems it is expeditious to stop the machine when a character is rejected, and to manually insert a representation of the rejected character into the reading machine output buffer or the like. This has been suggested before, for example in Rabinow Patent No. 3,181,119. A display device disclosed in that patent displays a group of identified characters with a mark (or space) replacing the rejected character within the group. By context, the machine operator is capable of filling in the rejected character. This will not be an operative system if the document contains material from which the identity of the rejected character cannot be deduced. An example is the majority of documents containing numbers only.

The system described in the above patent has a display which responds to the outputs of the reading machine, that is, the character-identity signals for the above mentioned group of characters. My present invention differs considerably from this in that I display the actual character which the machine has rejected in the graphic form in which the character is printed on the document being read. Thus, my invention displays by an optical projection system, the area of the document containing the character which the reading machine has rejected (or which may be selected for any other reason).

The above system has practical difficulties in its implementation. Ordinary optical systems used for reading machines must be precise from an optical standpoint because the images of the characters presented to the photosensitive scanner should be as true and crisp as reasonably possible. This is obvious because the central logic of the reading machine relies for its operation upon the character-defining information contained in the image of the character presented to the scanner. If that image is degraded, the central logic of the reading machine is placed at a decided disadvantage. Furthermore, reading machines are expected to identify characters at high rates of speed. The result of these considerations is that the lens system used to present character images to the reading machine scanner must be designed and constructed so that the length of the optical path involved are predetermined and maintained even though an entire line of print is examined, e.g. swept across the scanner character by character.

To explain the above by example, consider an optical reading system using an oscillating mirror to sweep (optically) over a cylindrical strip or section of a document containing a line of characters. Consider further that the elemental areas of the cylindrical strip are successively imaged on a photosensitive scanner along a fixed length optical axis. In order to gain the advantages of a short focal length lens, it should be located between the oscillating mirror and the cylindrical area being examined. Since we postulated a fixed axis path from the mirror surface to the scanner, a lens in the above position must move in a path concentric with the oscillating mirror, however, it must move through an angle twice that of the angular displacement of the mirror. To maintain the fixed length optical path between the mirror and the photosensitive scanner, the angular motion of the lens of double that of the mirror is required owing to the optical law that the angle of incidence is equal to the angle of reflectance from the mirror.

On the other hand, for a satisfactory optical display using the same oscillating mirror, the scanning lens is unsatisfactory. Different magnification and projection usages require a different lens in the optical system. Accordingly, I have means to displace the scanning lens from the optical path established from the document to the mirror and then to the scanner, and means to interpose a second lens in the optical path between the mirror and the photosensitive scanner. This second lens is preferably a portion of an optical subsystem which includes a reflective surface to direct the image formed by the second lens to a display screen.

Although the above procedure suggests a reasonably straightforward approach, it must be remembered that the optical system used for scanning must be a precise instrument. The optical axis from the mirror to the photosensitive scanner must be fixed, that is, it cannot vary otherwise misregistry problems are created. Secondly, the scanning lens must move at an angle precisely twice that of the angular displacement of the oscillating mirror for optical alignment and to assure that the optical path between the mirror and the scanner remains fixed for the examination of the entire line of print.

Accordingly, an object of my invention is to provide a simplified optical system for filling all of the above requirements and having the capability of being switched from a scanning mode during which successive images of the characters of a line of print are presented to the scanner of a reading machine, to a character display mode in which the image of a fraction of the line of print (for example one character) is displayed on a display device with a definition limited substantially only by the amount of light projected onto the area of the document and the quality of lens selected for projecting an image of the displayed character onto the display screen.

In the practice of my invention, I can use any conventional photosensitive scanner and reading machine central logic. A sweep mirror is mounted in alignment with the concave, cylindrical surface of the document to be examined. The sweep mirror can be mounted on a rotating or on an oscillating shaft. In order to obtain precise movement of the scanning lens, that is, a movement through twice the angle of the oscillating mirror and in exact synchronism with the movement of the mirror, I drive (oscillate) the scanning lens through a two-to-one gear train using the oscillating mirror shaft as the power input to the gear train. The gearing configuration is that of a differential so that the yoke or cage of the differential can be swung about the axis of the oscillation shaft while that shaft is held against the oscillatory motion. In other words, if the oscillating shaft is stopped and the yoke or cage of the differential is turned about the axis of the shaft, the differential gearing is such as to require the scanning lens to swing out of the optical path between the mirror and the document being examined. At the same time (or thereafter) I have a display lens assembly swing or otherwise move into the optical path between the mirror and the photosensitive scanner for the purpose of forming an image of the document fragment which is in alignment with the mirror at that time. The last mentioned image is directed by the display lens system onto a display screen. With my system in this adjusted position, the oscillating shaft supporting the mirror can be turned to any position within the design parameter so that any portion of the line of print can be displayed on the screen. In fact, the characters of the entire line can be swept (forward and backward) across and successively displayed on the screen.

Owing to the differential gearing there can be no slippage between the scanning lens and the mirror. Thus, by having two stops establishing the limits of movement of the yoke of the differential gearing (one stop for the scanning mode and the other for the display mode), the scanning lens must always return to its proper optical alignment with the mirror when the yoke is moved from the display position back to the scanning mode position.

A further object of my invention is to provide a reading machine optical system substantially as above, for sweeping successive images of characters along a line on a document, across a photosensitive scanner, or displaying one more of the characters on a screen so that they may be inspected.

Other objects and features of importance will become apparent in following the description of the illustrated form of the invention which is given by way of example only.

The figure of the drawing is a partially schematic perspective view of a fragment of a reading machine showing particularly the optical system for selectively scanning or displaying the characters on a document. The drawing shows only one example of my invention. However my invention can be used in any system requiring one lens in front and one in back of an oscillating mirror.

In the drawing I have shown scanner 10 as a photocell mosaic across which images of characters to be identified are swept. The scanner is operatively connected with the central logic section 12 of the reading machine. The operative connection is represented by cable 14. The type of scanner and the nature of the reading machine central logic may be varied without affecting my invention. As is customary in optical character reading machines, when there is an uncertainty in the identity of a particular character being examined by the scanner, a "reject" signal is given. I have illustrated line 16 as the conductor for reject signals.

Optical character reading machines are provided with document transports of one kind or another so that the documents, regardless of their nature, are handled in a manner such that the characters thereon can be imaged on the scanner. I have schematically illustrated document mover 18 as a moving belt. Here again, the specific kind of document mover which is used is not critical. It is not uncommon for the document mover to be under the control of a computer or under the control of computer-like logic built into the central reading machine. Since this is well known in the art I have shown no details thereof.

As mentioned before, it is preferable in certain reading systems or tasks, to stop the reading machine or at least, to inhibit character-identity output signals (prevent them from reaching the output buffer or the equivalent) in response to a character-reject signal. In other systems it is preferable to simply note a reject in the buffer and/or to mark the document being read in response to a character reject without stopping the reading function, or without inhibiting further character-identity signals from reaching the buffer after a reject signal. My invention is concerned with the former reading machine usage just as are prior Patents Nos. 3,156,894 and 3,181,119.

My invention is primarily concerned with the selective sweeping of character images across a conventional optical scanner of a reading machine or the display of one or more of such characters on a display device, for example screen 20. To exemplify my invention I have illustrated document 22 on document mover 18. The area 24 of the document to be examined between ends 25 and 26, is schematically represented. The area is curved arcuately so that all points of the area are equi-distant from the center of oscillating mirror 28.

The construction and operation of my optical system is described in the following sequence. First, there is a description of the sweeping of successive character images over photosensitive scanner 10 to enable these images to be scanned in a conventional manner. Secondly, the displaying of one or more characters (i.e. the optical display of a fraction of area 24 on a display screen 20) is described.

For the scanning mode, I have oscillating mirror 28 or the equivalent attached to oscillating shaft 30 driven by a suitable driver represented as motor 32 under the control of signals on command signal line 34. These signals may originate from the central reading machine logic, from a computer, or from other sources. Shaft 30 is mounted for oscillation in bearings 36 and 38 attached to the frame (not shown) of the document mover. Lens 40 (called "scanning" lens to distinguish it from subsequently described "display" lens 68) is supported by oscillating lens bracket 42. The lens 40 remains in optical alignment between the portion of area 24 being examined and the center part of the oscillating mirror. The optical axis is designated by line 44 from the object on surface 24 to mirror 28, and from mirror 28 the optical axis 46 extends to the surface of scanner 10. It is necessary that axis 46 be fixed for all oscillatory positions of mirror 28 as lens 40 sweeps between ends 25 and 26 of area 24. Since the angle of incidence of light along axis 44 is equal to the angle of reflection from mirror 28 along axis 46, lens 40 must move to an angle exactly twice that of the angular displacement of mirror 28 in order to keep axis 46 in a fixed position as area 24 is examined. To accomplish this I employ a gear train having a two-to-one ratio to couple the shaft 30 with the oscillating lens bracket 42 as explained below.

Yoke 48 has bearings 50 and 52 in its sides, and shaft 30 is disposed in these bearings. Gear 54 is pinned or otherwise fixed to shaft 30, and it is enmeshed with gear 56 having one-half the number of teeth as gear 54. Gear 56 is secured to shaft 58 which is mounted for rotation in bearings in the sides of yoke 48. Identical enmeshed gears 60 and 62 are secured to shaft 58 and to bracket 42 respectively. The bracket 42 and its drive gear 62 are mounted for free movement on oscillating shaft 30, for instance by bearing 64. Thus, as mirror 28 is oscillated with shaft 30 to which it is fixed, the lens bracket 42 (and hence lens 40) is required to oscillate through twice the angle (through the gearing described above) as the mirror. Thus, the above described optical system presents successive images of characters formed in a line along area 24, to the photosensitive optical scanner 10.

Consider now the situation where scanning by scanner 10 is interrupted and a portion of area 24 is displayed on screen 20. To accomplish this lens 40 must be removed from the optical path along line 44 and a projection or display lens 68 is interposed in the optical system. While lens 40 must be selected to best serve the main purpose of the reading machine, it is not a satisfactory lens for projection onto a display screen. Thus, for display purposes lens 68 is moved from a rest position A to position B at which it intercepts the light along axis 46 when lens 40 is removed from the optical path along axis 44. The motions of lens 40 and lens 68 are preferably synchronized by suitable means schematically represented by link 70.

Lens 68 is attached to a housing 72 at the front thereof, while the back of the housing has a mirror surface 74 at an angle to the plane of lens 68. Thus, mirror surface 74 directs the light reaching the mirror surface onto the display device, for example, screen 20.

Housing 72 is secured to a rocker 76 having a crank arm 78 to which one end of link 70 is attached. Solenoid 80 is also attached to crank 78 although other conventional devices can be used for moving crank arm 78 between to its extreme positions at which lens 68 is in or out of optical alignment with mirror 28. Since link 70 is attached to yoke 48, the yoke is required to oscillate between its two illustrated positions in synchronism with the movement of the display lens 68. This is more fully explained below.

To display an image of a portion of surface 24 on screen 20, solenoid 80 is actuated thereby moving lens 68 from position A to position B. During this time, however, shaft 30 is held fixed against oscillation and this function is represented by brake 82 on the shaft. Thus, as link 70 moves yoke 48 to position B by rotation about the longitudinal axis of shaft 30, lens bracket 42 is required to swing to position B while mirror 28 is held fixed. This is evident because gear 54 (being fixed to shaft 30) is stationary, and gears 56, 60 and 62 functioning as differential gearing or a differential gear system, rotate. Stops 84 and 86 attached to the frame of the machine establish the limits of motion of yoke 48. Stop 84 is particularly important because it provides a reference to which the yoke 48 is always returned (after displaying is complete) to assure the return of lens 40 to the exact relative position with respect to mirror 28 from which it was moved during the display mode.

Attention is directed to the control circuits which synchronize the above described functions with reading machine 12. During the ordinary reading mode brake 82 is released, and lens 68, lens 40 and yoke 48 are in positions A. When a character is rejected by the reading machine, a reject signal is provided on line 16, and that signal sets flip flop 90 via OR gate 91 and line 92. At the same time the reading machine 12 discontinues reading (or the outputs thereof are inhibited), and this function is represented by a stop switch 94 operated by a signal on line 96 which is attached to reject signal line 16 and to the stop switch 94 by way of OR gate 97 and line 98.

The output line 100 of the flip flop provides a signal to fire the one shot multivibrator 102, and the one shot signal on line 104 energizes (engages) brake 82 to seize and hold shaft 30. During this time the flip flop output signal on line 100 is conducted to solenoid 80 via line 106. Thus, the solenoid drives the yoke 48 to position B (thereby moving lens 40 to position B) and moves display lens 68 from position A to position B. Accordingly, the portion of area 24 in optical alignment with mirror 28, is imaged on display screen 20. In the usual case, it is the rejected character which is displayed.

The machine operator can then inspect the image on the display screen and actuate a conventional keyboard encoder 108 to provide a signal (or group of signals) on line 110 to the reading machine central logic, its buffer, etc. The signal is manually generated and represents the identity of the rejected character. Such signal, a function thereof, or a separate signal conducted on line 112 from the keyboard 108 is conducted to the reset terminal of flip flop 90 thereby de-energizing solenoid 80 and allowing its spring or other return means (not shown) to swing yoke 48 and lens 68 to position A. The reading machine is then prepared to continue the reading function. The reading machine 12 can be re-started by its conventional starting procedure or parallel controls can be provided at the keyboard encoder for the convenience of the machine operator.

When the reading machine optical system is adjusted to the display position, numerous operational options can be easily provided. For example, images of any fraction of area 24 or the entire area 24 can be successively displayed on screen 20 either in the forward or backward direction. This is accomplished simply by signals on command line 34 originating from a computer program or the equivalent within the reading machine 12, or manually by a switch and source of current operatively connected to motor 32. If desired, the re-set signal for flip-flop 90 (ultimately to restore the optical system to the reading mode) can originate from a source such as keyboard 108 or the re-set signal can be provided by the source-switch circuit 14. If one wishes, the machine-read interrupt can originate from the keyboard 108. This is particularly useful to manually insert the identity of characters on the document which the machine is incapable of identifying owing to font differences. For example, document 22 may be signed (hand-written) or contain handwritten sections, while reading machine 12 is designed to identify printed characters only. Thus, the machine operator may operate a key of the encoder which emits a signal over line 116 to set flip-flop 90 via OR gate 91 and line 92 and which exercises a stop function for the reading machine central logic via OR gate 97 and line 98 and switch 94. Then either under operator control or computer program control, command signals on line 34 can require area 24 to be displayed in a running fashion on screen 20 while the machine operator inspects the screen and keys the identities of the handwritten characters into the reading machine or its buffer.

It is important to note that when yoke 48 is moved from position A to position B and lens 40 is removed from the optical path between the mirror and the precise portion of area 24 being examined, shaft 30 is held stationary. Thus, when the yoke 48 is returned from position B to position A exact optical alignment of lens 40 with mirror 28 and the section of area 24 is maintained (the lens 40 returns to the same position from which it was moved) because yoke 48 starts from and returns to the same position owing to precise stop 84. If shaft 30 is moved while yoke 48 is in position B (owing to command signals on line 34), the signals must be such as to restore shaft 30 to its original position after it has cycled to display the various portions of area 24 on screen 20. Such signals are well within the capability of a computer.

It is understood that the foregoing and other changes may be made in the invention as illustrated and described without departing from the protection of the following claims.

I claim:

1. In an optical character reading machine having a scanner and a logic section for identifying characters on a document, an optical system for presenting successive images of characters on the document for a machine reading mode of operation, said optical system including a movable reflective member adapted to sweep across an area of the document, a scanning lens located between the document and said reflective member, synchronizing means coupling said reflective member and said scanning lens to require said member and said lens to synchronously move so that the optical axis between said reflective member and said scanner remains fixed as said member and said lens are moved, means associated with said synchronizing means for displacing said scanning lens from the optical path between said reflective member and said document to prepare said optical system for a character area display mode, a display device, and means operative with said scanning lens moving means for intercepting light reflected from said reflective member and for directing said light to said display device.

2. The subject matter of claim 1 wherein the last mentioned means include a display lens which becomes optically aligned with said display device by means of a reflective surface when said system is in the display mode, and the last mentioned surface prevents the light reflected from said oscillating member from reaching said scanner.

3. The subject matter of claim 1 wherein said synchronizing means include a differential gear system including a yoke, and at least one stop with which said yoke is operatively associated to establish a reference position for said yoke.

4. In an optical character reading machine for characters formed in a line on a transversely curved document, an optical scanner to extract information from images of the characters to enable the reading machine to identify said characters, an optical system to form said images on said scanner, said optical system including a shaft, means for oscillating said shaft, a reflective member attached to said shaft and confronting the area of the document to be examined, a scanning lens located between the document and said reflective member, a lens bracket supporting said lens and mounted for rotation about an axis concentric with the axis of said shaft, differential gearing connected to said shaft and to said lens bracket to oscillate said lens bracket through an angle twice that of the angular deflection of said reflective member, whereby the optical path between said reflective member and said scanner is fixed for all angular positions of said oscillating reflective member, selectively operable display means for displaying at least one of the characters on the document, said display means including a display device, a display lens, mounting means for said display lens, said mounting means adapted to move from a position at which the display lens is separated from the optical path between said reflective member and said scanner to a position at which the last mentioned axis is intercepted by said display lens, and means to so move said display lens and synchronously to actuate said differential gearing in a manner to separate said scanning lens from optical alignment between the reflective member and the portion of the document being examined.

5. The subject matter of claim 4 and brake means for holding said oscillating shaft stationary while said differential gearing is adjusted to the position at which said scanning lens is removed from the optical path between said reflective member and document.

6. The subject matter of claim 5 wherein said reading machine provides a reject signal in response to the rejection of a character examined by said scanner, and said brake means and said means for moving said second lens and adjusting said differential gearing being responsive to said reject signal.

7. The subject matter of claim 5 and manual means operatively connected with the reading machine for providing character identity signals adapted to be used as replacements for character identity signals provided by the reading machine.

References Cited

UNITED STATES PATENTS

| | | | |
|---|---|---|---|
| 2,586,963 | 2/1952 | Knutsen | 340—146.3 |
| 3,156,894 | 11/1964 | Greanias | 340—146.3 |
| 3,273,446 | 9/1966 | Goetz et al. | 350—6 |
| 3,284,568 | 11/1966 | Cook et al. | 178—7.6 |

MAYNARD R. WILBUR, *Primary Examiner.*

THOMAS J. SLOYAN, *Assistant Examiner.*

U.S. Cl. X.R.

178—7.6; 250—219; 350—6, 7, 38